Patented Feb. 13, 1945

2,369,407

UNITED STATES PATENT OFFICE 2,369,407

DRILLING FLUIDS

William W. Robinson, Jr., Los Angeles, Calif., assignor to The Texas Company, New York, N. Y., a corporation of Delaware No Drawing. Original application May 17, 1935, Serial No. 21,978. Divided and this application January 13, 1944, Serial No. 518,117

10 Claims. (Cl. 252—8.5)

This invention relates to drilling muds and more particularly to the preparation of drilling muds employed in the drilling of wells.

This application is a division of my application Serial No. 21,978, filed May 17, 1935.

In its broadest aspect, my invention contemplates the preparation of a drilling mud by combining a dispersion of clay in water with certain chemical compounds whereby the resulting composition of matter is an ideal drilling fluid characterized by being substantially immune to deterioration by base exchange.

Drilling muds are almost universally used in the drilling of wells employed for tapping underground collections of oil, gases, brines, and water. These muds fulfill various functions, the most important of which are to assist in the removal of cuttings from the wells, to seal off gas pockets which may be encountered at various levels, and to lubricate the drilling tools and the drill pipes which carry the tools.

Drilling muds are essentially mixtures of clay and water, usually so compounded that they weigh from eight to twelve pounds per gallon. Whenever it is found necessary to increase the specific gravity of a particular mud, it is customary to add thereto finely-divided materials which have a high specific gravity such as barytes, etc.

An ideal drilling mud is one which is thixotropic, that is to say, a fluid which, on agitation by pumping or otherwise, has a relatively low viscosity and is free-flowing but, when agitation is stopped, gradually sets or gels. This gelling action is sufficiently slow to permit the cuttings to settle two or three feet before the gel structure is strong enough to support them. When such a drilling mud is circulated through a well, it picks up the cuttings and carries them to the surface and there, upon settling in a settling pit, the cuttings settle out, leaving a substantially cuttings-free drilling mud.

The use of a drilling mud, which is not thixotropic, is attended by many disadvantages, the more important of which will be discussed briefly. A non-thixotropic drilling mud is difficult to pump and does not allow proper and complete settling of the cuttings in the settling pits where the mud is in a relatively quiescent state. Furthermore, it will be observed that it clings to the drill pipe and the drilling tools and thus exerts an appreciable braking action. In addition to these undesirable properties, it has been observed that the use of a non-thixotropic drilling mud may cause gas blowouts where the well traverses strata containing gases under high pressure. When drilling through such strata, the hydrostatic head of the drilling mud serves normally t more than counterbalance the gas pressure During the drilling operations, when it become necessary to withdraw the drill pipe and th drilling tools, the non-thixotropic drilling mu will cling thereto. In this manner the balanc that has existed between the hydrostatic head o the drilling mud and the gas pressure is disturbe and, if the gas pressure is higher than the les sened hydrostatic head of the drilling mud, a ga blowout occurs.

Drilling muds consist essentially of colloid dispersions of clay in water. When this is con sidered, in conjunction with the further fact tha the thixotropic character of a drilling mud is function of its colloidal condition, it become obvious that the clay particles, having a siz within the colloidal particle size range, determin largely the thixotropic character of a drillin mud. The aforementioned colloidal particles ( clay are essentially acids whose anion is a mice of the general formula

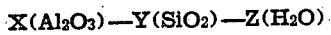

where X is approximately 1, Y is approximatel 3, and Z may vary over wide values.

In the interests of simplicity, the aforemer tioned anion will be termed hereinafter as cla and the compounds formed by its combinatic with various cations will be termed clays of suc cations; so, for example, the hydrogen compour will be termed hydrogen clay or acid clay, tl sodium compound will be termed sodium cla while the calcium compound will be called ca cium clay. For purposes of this discussion, v consider three types of clays, acid clays, clays ( monovalent ions such as sodium clays and mult valent clays such as calcium or magnesium clay It has been observed that dispersions in wat of either acid clays or multivalent ion clays ter to gel with great rapidity and are easily coagu lated. It is obvious that such types of dispersio are difficult to use as drilling muds.

The deterioration of thixotropic drilling mu involves the conversion of a monovalent clay in either an acid clay or a multivalent ion cla The former occurs when the thixotropic drilli mud encounters acid strata whereby the hydr gen ions of the strata displace the desirak monovalent ions of the clay, resulting in the fo mation of an acid clay. The latter type of dete ioration, which is much more common, occu when a drilling mud encounters strata of calciu and magnesium compounds. Under such circumstances, the phenomenon, known as base exchange, occurs whereby the monovalent ion clays of the thixotropic drilling mud are converted into multivalent ion clays.

I have discovered that by incorporating sodium hexametaphosphate in a thixotropic drilling mud under the conditions described below, the drilling mud may be made more stable against deterioration by base exchange. Sodium hexametaphosphate is usually ascribed the formula $(NaPO_3)_6$, and is available commercially in a form which upon solution in water gives an alkaline reaction.

Not only may sodium hexametaphosphate be employed for rendering thixotropic drilling muds more stable against base exchange, but it may also be employed as described below for converting a drilling mud containing multivalent ion clays into drilling muds having the characteristics of muds containing desirable monovalent ion clays. So, for example, by treating a drilling mud containing a calcium clay with sodium hexametaphosphate, it may be converted into one having the characteristics of a drilling mud containing a sodium clay.

In accordance with the invention, the sodium hexametaphosphate is preferably employed in proportions corresponding to 0.001 to 0.1% by weight of the drilling mud. The use of sodium hexametaphosphate in an amount within this range is usually sufficient to accomplish the desired results; while, at the same time, overtreatment of the drilling mud is avoided. It will be understood, of course, that the optimum amount to be used in a given case will depend upon the specific characteristics of the drilling mud in question.

It has been found that drilling muds, consisting essentially of dispersions of monovalent ion clays in water, are particularly valuable as drilling fluids when they are maintained within a particular range of pH concentration, which range may be in the neighborhood of from 8.0 to 11.5. In order that a drilling mud, treated with sodium hexametaphosphate, may be maintained within this range of pH concentration, I preferably employ, in connection with the hexametaphosphate salt, a buffer salt or buffer salt mixture such, for example as salts of weak acids as sodium carbonate, disodium phosphate or the like, or balanced mixtures of hydroxides such as sodium and lithium hydroxides, or similar hydroxides with corresponding salts of such acids as boric, phosphoric, carbonic, oxalic, silicic, and similar weak acids.

When electrolytes are dissolved in a drilling mud, they may, to a limited extent, cause a slight coagulation of the drilling mud. Therefore, when employing either sodium hexametaphosphate alone or in combination with a buffer salt or a buffer salt mixture, I find it desirable to minimize the coagulation effect of this salt on the drilling mud, by incorporating therein a lyophile colloid such as quebracho, straw emulsion, dextrin, casein, catechu, and similar materials.

Accordingly, exceptionally valuable drilling muds of the invention are alkaline thixotropic dispersions comprising clay, water, sodium hexametaphosphate and a buffer salt or a buffer salt mixture adapted to maintain the dispersions in an alkaline state. Especially preferred drilling muds of this class also contain a lyophile colloid.

In order that those skilled in the art may more readily appreciate the particular effectiveness of sodium hexametaphosphate, I offer herewith the results of comparative experiments in which a non-thixotropic calcium clay drilling mud was treated with various types of inorganic compounds. The drilling mud employed when tested in the Marsh funnel viscosimeter, using 300 cubic centimeter samples, was found to have a viscosity of 67.5 seconds. The mud was then treated with 0.001, 0.01 and 0.1 percentage by weight of the compounds indicated in the following table. The figures appearing in the three columns are the viscosities in seconds of the treated samples when tested in the Marsh funnel viscosimeter.

|  | 0.001% | 0.01% | 0.1% |
| --- | --- | --- | --- |
|  | Seconds | Seconds | Seconds |
| Trisodium phosphate | 65.6 | 49.0 | 43.0 |
| Disodium phosphate | 53.0 | 47.5 | 35.5 |
| Sodium hexametaphosphate | 49.0 | 26.0 | 18.0 |
| Orthophosphoric acid | 49.0 | 34.0 | 35.0 |
| Soda ash | 56.0 | 53.5 | 48.0 |

Since viscosity is a direct measure of the desirability of a drilling mud, it is obvious from the foregoing table that sodium hexametaphosphate is an effective agent for the treatment of calcium clay drilling muds.

My invention may be carried out in several different ways. For example, I may prepare a thixotropic drilling mud which is substantially immune to deterioration by base exchange by forming a dispersion of a suitable monovalent ion clay in water and adding to the so-formed drilling mud a quantity of sodium hexametaphosphate sufficient to maintain the viscosity of the mud relatively constant during use. I also contemplate the continuous addition of sodium hexametaphosphate during use to maintain it in the proper condition. My invention may also be employed for converting drilling muds which have been deteriorated by base exchange into non-thixotropic drilling muds, and I accomplish this result by adding to the deteriorated drilling mud a sufficient quantity of sodium hexametaphosphate to restore it to a thixotropic state.

As a further application of my invention, I contemplate the use of sodium hexametaphosphate in connection with drilling muds containing bentonites. This type of drilling mud has found substantial use particularly in wells where heaving shale is encountered. However, drilling muds containing bentonitic clays have a strong tendency to rapid conversion from a thixotropic state into a gelled mixture. By combining sodium hexametaphosphate with such a drilling mud in appropriate proportions, I have found that the same is rendered stable and not subject to rapid deterioration upon changes in composition.

As an example of this modification of my invention, I offer herewith data showing the value of sodium hexametaphosphate when used in conjunction with a dispersion of bentonite in water. In these experiments, I employed a commercial type of bentonite, sold under the trade name of "Aquagel." A typical analysis of this bentonite is as follows:

|  | Per cent |
| --- | --- |
| Silica | 49.52 |
| Iron oxide | 2.42 |
| Aluminum oxide | 16.71 |
| Calcium oxide | 4.40 |
| Magnesium oxide | 5.07 |
| Sodium and potassium oxides | 4.49 |
| Moisture | 9.85 |
| Combined water and volatile matter | 6.64 |
| Sulfuric anhydride | 0.45 |
| Chlorine | 0.46 |

Five dispersions were prepared containing respectively 1%, 2%, 4%, 6%, and 7.75% of the bentonite in water. The viscosities of these dispersions were obtained by means of the Stormer viscosimeter and are reported in the following table in centipoises. To samples of the respective dispersions, there was then added 1% by volume of a 10% solution of sodium hexametaphosphate and the viscosities of the so-treated dispersions again determined. The viscosities in centipoises are listed in the third column of the following table:

| Percent of Aquagel dispersed in water | Absolute viscosity of Aquagel dispersion | Absolute viscosity of Aquagel dispersion containing 1% by volume of 10% solution of sodium hexametaphosphate |
| --- | --- | --- |
|  | Centipoises | Centipoises |
| 1% | 1.0 | 1.0 |
| 2% | 1.0 | 1.0 |
| 4% | 5.0 | 1.5 |
| 6% | 24.0 | 5.0 |
| 7.75% | 70.0 | 31.0 |

The above results clearly indicate the value of sodium hexametaphosphate for maintaining the thixotropic character of a bentonite dispersion. Similar effects may be secured by treating drilling muds containing ordinary monovalent ion clays to which have been added varying percentages of bentonite clays.

Obviously many modifications and variations of the invention as hereinbefore described may be made without departing from the spirit and scope thereof, and therefore only such limitations should be imposed as are indicated in the appended claims.

I claim:

1. A drilling mud in the form of an alkaline thixotropic dispersion comprising clay, water, sodium hexametaphosphate, and a buffer salt adapted to maintain the dispersion in an alkaline state.

2. A drilling mud in the form of an alkaline thixotropic dispersion comprising clay, water, sodium hexametaphosphate, a lyophile colloid, and a buffer salt adapted to maintain the dispersion in an alkaline state.

3. The method of treating a circulating drilling mud consisting of an alkaline thixotropic dispersion comprising clay and water employed in the drilling of a well, which comprises adding to said drilling mud sodium hexametaphosphate and a buffer salt adapted to maintain said drilling mud in an alkaline state.

4. The method of treating a circulating drilling mud consisting of an alkaline thixotropic dispersion comprising clay and water employed in the drilling of a well, which comprises adding to said drilling mud sodium hexametaphosphate, a lyophile colloid, and a buffer salt adapted to maintain said drilling mud in an alkaline state.

5. A drilling mud comprising clay, water and from 0.001 to 0.1% by weight of sodium hexametaphosphate.

6. A method of converting a drilling mud comprising multivalent ion clay and water to a thixotropic drilling mud which comprises adding thereto from 0.001 to 0.1% by weight of sodium hexametaphosphate.

7. A drilling mud in the form of an alkaline thixotropic dispersion comprising clay, water, from 0.001 to 0.1% by weight of sodium hexametaphosphate, and a buffer salt adapted to maintain the dispersion in an alkaline state.

8. A drilling mud in the form of an alkaline thixotropic dispersion comprising clay, water, from 0.001 to 0.1% by weight of sodium hexametaphosphate, a lyophile colloid, and a buffer salt adapted to maintain the dispersion in an alkaline state.

9. The method of treating a circulating drilling mud consisting of an alkaline thixotropic dispersion comprising clay and water employed in the drilling of a well, which comprises adding to said drilling mud from 0.001 to 0.1% by weight of sodium hexametaphosphate, and a buffer salt adapted to maintain said drilling mud in an alkaline state.

10. The method of treating a circulating drilling mud consisting of an alkaline thixotropic dispersion comprising clay and water employed in the drilling of a well, which comprises adding to said drilling mud from 0.001 to 0.1% by weight of sodium hexametaphosphate, a lyophile colloid, and a buffer salt adapted to maintain said drilling mud in an alkaline state.

WILLIAM W. ROBINSON, Jr.